United States Patent
Dreibholz et al.

(10) Patent No.: US 6,969,338 B2
(45) Date of Patent: Nov. 29, 2005

(54) METHOD FOR CONTROLLING AND REGULATING A DRIVE TRAIN

(75) Inventors: Ralf Dreibholz, Meckenbeuren (DE); Detlef Baasch, Friedrichshafen (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 127 days.

(21) Appl. No.: 10/450,084

(22) PCT Filed: Jan. 14, 2002

(86) PCT No.: PCT/EP02/00254

§ 371 (c)(1),
(2), (4) Date: Jun. 9, 2003

(87) PCT Pub. No.: WO02/057108

PCT Pub. Date: Jul. 25, 2002

(65) Prior Publication Data

US 2004/0029679 A1    Feb. 12, 2004

(30) Foreign Application Priority Data

Jan. 17, 2001   (DE) ............................... 101 01 863

(51) Int. Cl.$^7$ .............................................. B60K 41/02
(52) U.S. Cl. ....................... 477/77; 477/78; 74/336 R
(58) Field of Search ................... 477/77, 78; 74/336 R, 74/335

(56) References Cited

U.S. PATENT DOCUMENTS

| | | | |
|---|---|---|---|
| 3,412,625 A | 11/1968 | Oldberg et al. ............... | 74/368 |
| 4,616,521 A | 10/1986 | Akashi et al. ................ | 74/335 |
| 4,622,866 A | 11/1986 | Ito et al. ....................... | 74/866 |
| 4,860,607 A | 8/1989 | Numazawa et al. .......... | 74/330 |
| 5,056,639 A * | 10/1991 | Pelzold et al. .............. | 477/176 |
| 5,390,562 A * | 2/1995 | Sherman ...................... | 74/335 |
| 6,604,438 B2 * | 8/2003 | Ruhle et al. .................. | 74/335 |

FOREIGN PATENT DOCUMENTS

| | | | | |
|---|---|---|---|---|
| DE | 195 04 847 A1 | 9/1995 | .......... | B60K 23/00 |
| DE | 197 35 759 A1 | 2/1999 | .......... | B60K 41/22 |
| DE | 198 56 326 A1 | 6/2000 | .......... | F16H 63/40 |
| DE | 199 08 602 A1 | 9/2000 | .......... | B60K 41/22 |
| DE | 199 16 655 A1 | 11/2000 | .......... | B60K 26/00 |
| GB | 2 117 068 A | 10/1983 | ............. | F16H 5/60 |
| JP | 58065327 | 4/1983 | .......... | F16D 11/10 |
| JP | 08109950 | 4/1996 | ............. | F16H 3/10 |

* cited by examiner

*Primary Examiner*—Ha Ho
(74) *Attorney, Agent, or Firm*—Davis & Bujold, P.L.L.C.

(57) ABSTRACT

Described is a method for controlling and regulating a drive train of a vehicle comprising one drive unit, one transmission and one output unit. The transmission has controllable free-wheel device corresponding with toothed wheel pairs for disconnecting or connecting an old or a new gear and located on the input side one clutch. In the presence of a shifting signal for carrying out a higher traction shift, an input torque of the drive unit is quickly reduced so that a first vibration is induced in the drive unit. During a subsequent shifting, an operative connection is abruptly created between a free-wheel device and a toothed wheel pair corresponding therewith in a manner such that a second vibration counteracting the first vibration is produced in the drive train. With the engagement of the new gear the operative connection of the old gear is canceled as a result of a torque reversal from a pull torque to a push torque.

19 Claims, 2 Drawing Sheets

METHOD FOR CONTROLLING AND REGULATING A DRIVE TRAIN

FIELD OF THE INVENTION

The invention relates to a method for controlling and regulating a drive train of a vehicle having one drive unit, one transmission and one output unit.

BACKGROUND OF THE INVENTION

In DE 197 35 759 A1 a method is described for control of an automatic drive device which has one propeller source, one speed-change transmission with several toothed wheel sets that can be coupled, one fluid-actuatable main clutch and a fluid-actuatable switch means for actuating the individual toothed wheel sets. In addition, an electronic control is provided for the control of the main clutch and of the switch means, the main clutch being retained in a slipping state for attaining a changeover of the switch means free of traction interruptions.

To switch the forward gears, there is provided as coupling element or switch means respectively on a transmission input shaft and on a transmission output shaft, one draw key device actuated by a hydraulic adjusting element for changing over the reduction steps or forward gears. At the same time, two idler toothed wheels, having each two fixed toothed wheels, can be coupled, respectively, upon the transmission input shaft or the transmission output shaft.

Within a central hole in the transmission output shaft, a tappet is movably passed which, as a form-locking coupling element, carries a draw key. The draw key penetrates a radial slot in the input shaft and interacts with longitudinal grooves in the toothed wheels. The length of the radial slot allows an axial displacement of the draw key, via the tappet, from a first position in which the draw key couples with positive fit a first toothed wheel with the transmission input shaft, to a medium idling position in which the draw key produces no connection with positive fit between the transmission input shaft and a toothed wheel and to a third position in which one other toothed wheel of a new ratio step is coupled with positive fit with the input shaft.

In order to make possible a low-wear complete switch of the draw key from one toothed wheel to the other toothed wheel, the cross-section of the opening of a throttle valve of the internal combustion engine is reduced for a brief time interval during the shifting operation independently of an accelerator pedal input so as to reduce the input torque of the internal combustion engine to the range of from milliseconds to tenths of seconds.

However, the above described method for control of an automatic driving device has the disadvantage that during a higher traction shift, the draw key or the switching element has to be disengaged from the toothed wheel, which requires great switching forces. To reduce said switching forces, it has been proposed to reduce the input torque of the internal combustion engine to shifting torque, the drive train of a motor vehicle being completely unloaded by said procedure, which results in an interruption of the traction force.

The problem on which this invention is based is to make a method available for control and regulation of a drive train by means of a higher traction shift being carried out quickly and without traction interruption together with great comfort during shifting.

SUMMARY OF THE INVENTION

With the inventive method for control and regulation of a drive train of a vehicle in which an old gear or a new gear can be disengaged or engaged via controllable free-wheel devices, it is advantageously possible to omit an unloading of the drive train, thus preventing a traction interruption during a higher traction shift.

This essential advantage results from the fact that the new gear or the operative connection between a controllable free-wheel device and a toothed wheel pair of the new gear is suddenly engaged, an actually introduced old gear or the operative connection between a controllable free-wheel device associated with the old gear and a toothed wheel pair that forms the ratio step of the old gear, being canceled almost simultaneously. As a result of this procedure, a power flow in the drive train advantageously is not interrupted during the gear shift proper and a traction interruption is prevented in a simple manner.

One other advantage of the inventive method is that undesired vibrations in the output train, occurring during the shift operation, are prevented. Such a second vibration occurs, for example, due to the sudden or spontaneous engagement of the new gear, since the rotary masses on the transmission input side are almost suddenly coupled by the free-wheel device of the new gear with the corresponding differential rotational speed, which results in a definite impact and high loading of the parts on the transmission input side and transmission output side.

To reduce said vibration, during the cycle of the method, it has been provided that an input torque of the drive unit be quickly reduced prior to engagement of the new gear whereby in the drive train a first vibration is advantageously generated which counters the second vibration that appears only after the first vibration. Due to the springs and rotary masses contained in the output unit, the reduction of the input torque leads at first only to a slight discharge of the output unit and after some time to a dampened vibration excitation of the output unit. Due to the engagement of the new gear and the second vibration produced thereby, the two counteracting vibrations diminish whereby the comfort in shifting is improved and the load of the parts of the drive train is reduced.

An excessive increase of the torque occurring in the drive train due to the engagement of the new gear is thus advantageously prevented by a previous reduction of the input torque of the drive unit and the drive train excited by the shifting or, an oscillating output torque is adjusted within the shortest time to a constant value of the new gear.

BRIEF DESCRIPTION OF THE DRAWINGS

The invention will now be described, by way of example, with reference to the accompanying drawings in which.

DETAILED DESCRIPTION OF THE INVENTION

Figure 1:
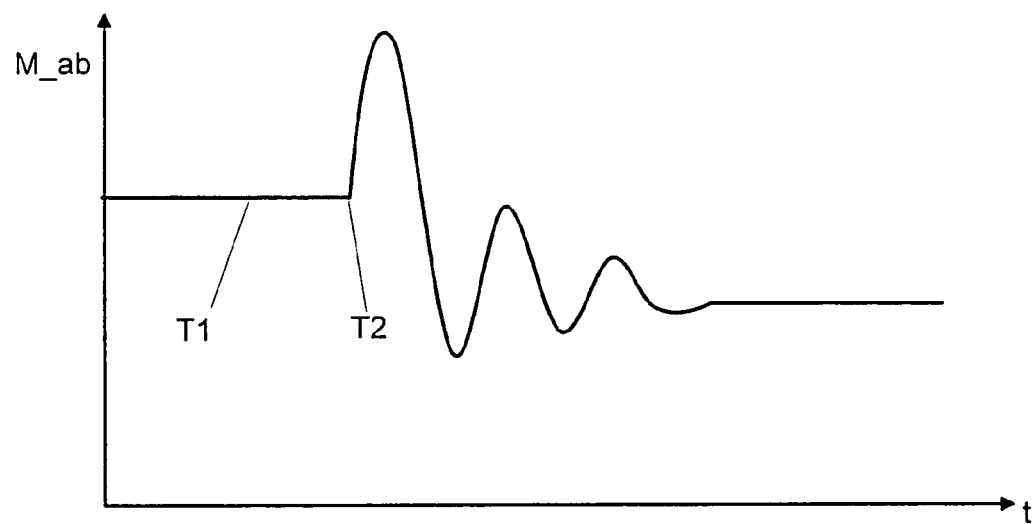
FIG. 1 is a schematized curve of an output torque during a shifting process without motor engagement.
Figure 2:
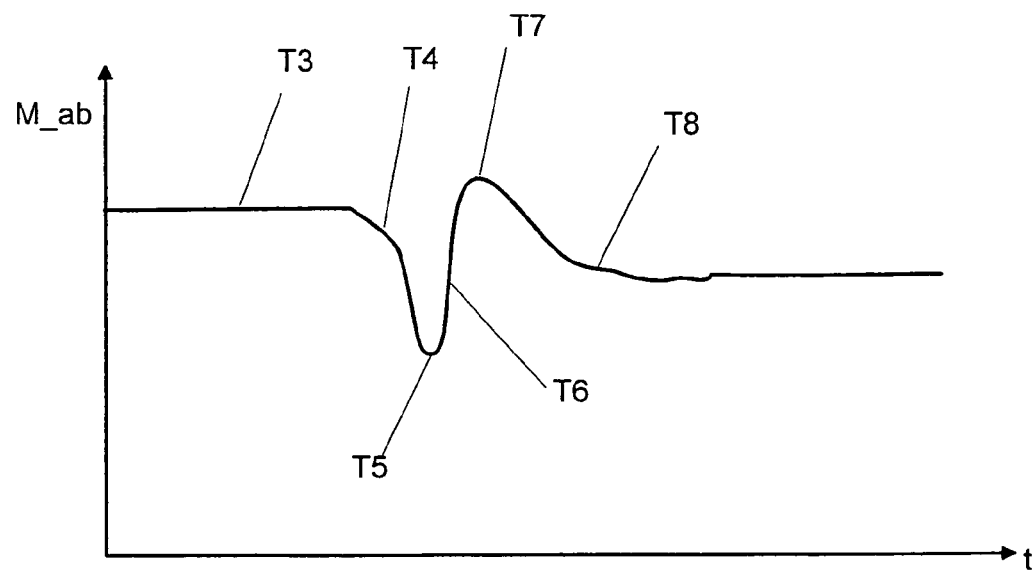
FIG. 2 is a schematized curve of an output torque during a shifting process with anti-phase motor engagement.

The mode of operation of the inventive method for control and regulation of a drive train of a vehicle is indicated with reference to the curves of an output torque M_ab during a shifting cycle of a higher traction shift shown in FIG. 1 and FIG. 2 where FIG. 2, unlike FIG. 1, reproduces the curve when the inventive method is used.

In FIG. 1 is shown the curve of a torque M_ab on an output unit of a drive train of a vehicle or of a motor vehicle during a shifting operation from an old gear to a new gear in the course of a higher traction shift such as it would shape itself when the invention method is used. The shown curve of the output torque M_ab is accomplished without a reduction of an input torque of a drive unit of the drive train. The output torque M_ab and the curve are plotted in FIG. 1 in the course of time t and have in a first range T1, in which in a transmission of the drive train an actual ratio of an old gear is adjusted, an at least approximate constant value. At a point T2, where the output torque M_ab rises steeply, a ratio of a new gear is suddenly adjusted, which leads to an acceleration of the output unit and to an increase of the output torque M_ab. With the increase of time, the vibration generated in the drive train by the engagement of the new gear is dampened until it becomes adjusted to a value of the output torque M_ab of the new gear which is equivalent to a ratio of the new gear.

Figure 3:
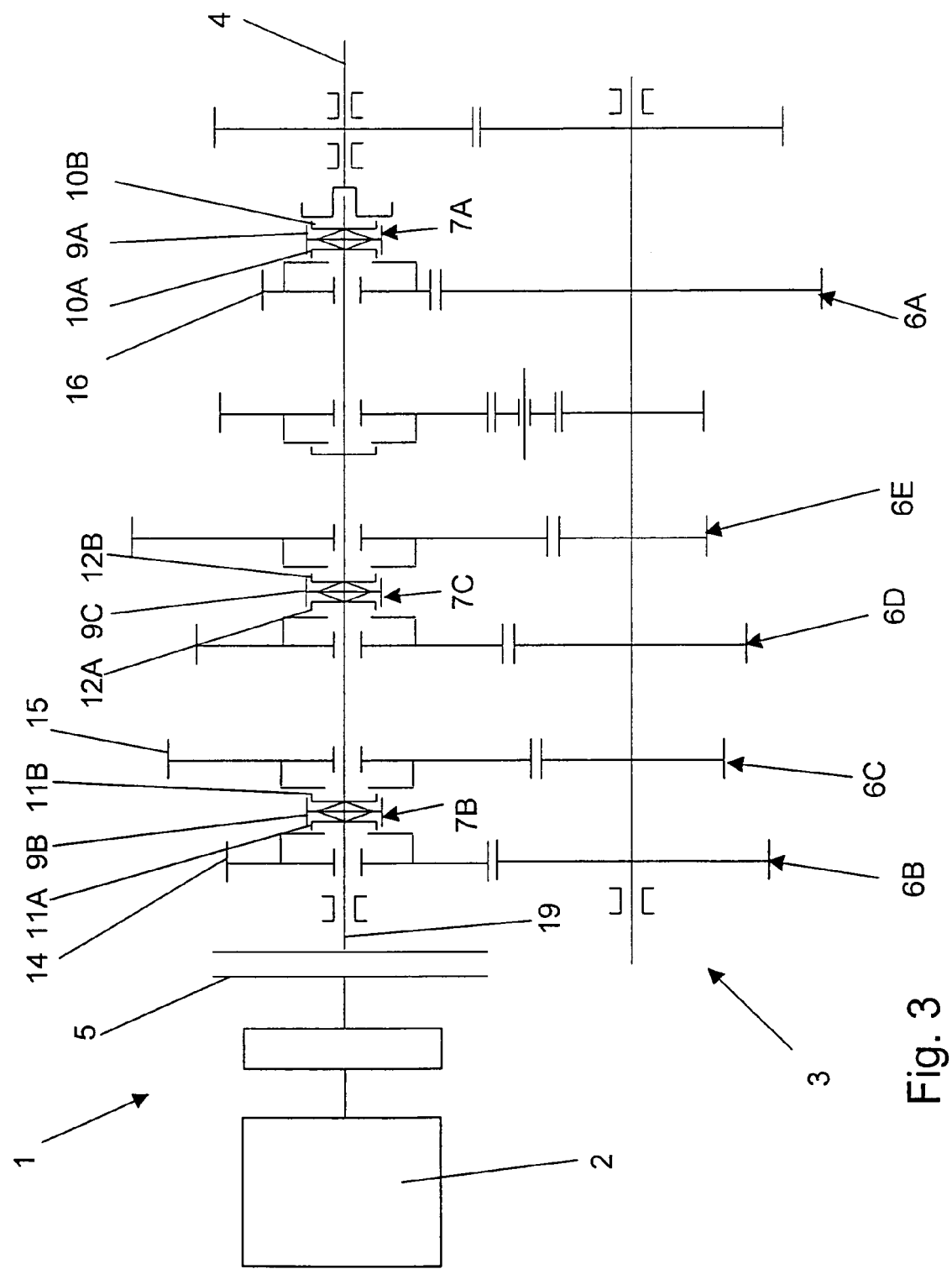
FIG. 3 is a schematized representation of a drive train with a wheel diagram of a transmission situated in the drive train, a power-dividing shift element being located upon an input side of a transmission.

The curve of the output torque M_ab during a shifting operation, which is shown in FIG. 2, is based on a drive train 1 schematically shown in FIG. 3, the transmission 3 of which has controllable free-wheel devices 7A to 7C corresponding with toothed wheel pairs 6A to 6E for disengaging or engaging an old or a new gear and a clutch 5 located on the input side. The free-wheel devices 7A to 7C are each constructed with a gear change sleeve 9A, 9B, 9C and respective clutch pulleys 10A, 10B, 11A, 11B, 12A, 12B located between two idle wheels 14, 15, 16 of the toothed wheel pairs 6A to 6E and the gear change sleeves 9A, 9B, 9C. Depending on an axial position of the gear change sleeves 9A, 9B, 9C movably passed in axial direction of the transmission 3, it is possible, via the free-wheel devices 7A to 7C in the drive train 1, to guide pull torques and/or push torques from the drive unit 2, via the transmission 3 and a transmission output shaft 17, to the output unit 4.

In the presence of a shifting signal for carrying out a higher traction shift, an input torque of the drive unit 2 is first quickly reduced so that a first vibration is induced in the drive train 1.

During a subsequent shifting operation, an operative connection between a concerned free-wheel device of the free-wheel devices 7A to 7C and a toothed wheel pair of the new gear corresponding therewith is abruptly or suddenly produced in a manner such that a second vibration counteracting the first vibration is produced and the operative connection of the old gear is canceled with the engagement of the new gear as result of a torque reversal from a pull torque to a push torque. As shown in FIG. 2, in this procedure an output torque M_ab or a curve of an output torque M_ab appears on the output unit 4.

An engagement point of the new gear is provided in a manner such that the induced first vibration and the produced second vibration almost compensate cancel each other. The engagement point of the new gear is here preferably provided after the reduction of the input torque and prior to the first load change.

According to the curve of the output torque in FIG. 2, to begin with a first section designated by T3, there is shown more specifically with a constant value of the output torque M_ab which reproduces a normal driving operation range of the drive train 1. Subsequently, the output torque M_ab lowers to one other range T4 of the curve of the output torque M_ab, said lowering of the output torque M_ab being caused by the reduction of the input torque of the drive unit 2.

The sudden engagement of the new gear takes place prior to reaching a minimum T5 of the curve of the output torque. The form-locking operative connection is produced between the concerned free-wheel device and the toothed wheel pair of the new gear corresponding therewith. By the engagement of the new gear, the output unit 4 of the drive train 1 is accelerated whereby, in a second section T6 of the curve of the output torque M_ab according to FIG. 2, the value of the output torque M_ab rises up to a point T7 and then, according to a third section T8, runs counter to a value of the output torque M_ab equivalent to the ratio of the new gear. A transmission input shaft 19 is decelerated at the same time.

In the presence of a shifting signal and prior to the engagement of the new gear, a transmission capacity of clutch 5, situated on the input side is adjusted so that an actual input torque of the drive unit 2, abutting on the clutch is transmitted to the output unit 4 and the clutch 5 has no slip or only a very mild one.

Upon a shifting command for carrying out a higher traction shift, an operative connection between one of the free-wheel devices 7A to 7C and a toothed wheel pair 6A to 6E of the old gear corresponding therewith is controlled so that via said operative connection abutting pull torques are transmitted from the drive unit 2 to the output unit 4 of the drive train 1 and that said operative connection of the old gear is canceled as soon as a push torque abuts on the operative connection.

The free-wheel devices 7A to 7C of the transmission 3 have for the purpose such a structural development that they can transmit abutting pull and push torques, the free-wheel devices associated with the old gear or during a shift, especially a higher traction shift, being controlled so that they transmit only abutting pull torques and upon a torque reversal to a push torque are quickly and spontaneously released from a form-locking operative connection via corresponding toothed wheel pairs. Such torque reversal occurs due to the engagement of the new gear, the operative connection being canceled with a sudden engagement of the new gear simultaneously or immediately after engagement of the new gear.

It can be provided for the purpose that a toothed wheel pair corresponding with the free-wheel device or a part situated on the toothed wheel pair, by which the form-locking operative connection of a gear is produced, has a flashing side which, during an abutting push torque, causes the free-wheel device suddenly to disengage from the toothed wheel pair.

With this development of the free-wheel devices 7A to 7C and of the toothed wheel pairs 6A to 6E corresponding therewith or of the operative connections that can be created between said parts, it is possible to extremely quickly carry out under full load a spontaneous or sudden change from one ratio of an old gear to one ratio of a new gear.

When the drive unit 2 is designed as petrol motor, the reduction of the input torque of the drive unit 2 is implemented, via an ignition engagement, whereby the desired quick reduction of the input torque can be accomplished. If the output unit 2 is designed as a diesel motor, the reduction of the input torque is preferably implemented in a simple manner within the short time required via a scattering of an injection.

To further improve the comfort in shifting, the transmission capacity of the clutch 5 is adjusted throughout the shifting operation to a preset torque range so that when the new gear is engaged, the clutch 5 converts from a slip-free or low-slip state to a slipping state, it being thus obtained that both vibrations be dampened and a synchronization operation can take place between the transmission 3 and the drive unit 2 by a regulation of the transmission capacity of the clutch 5. It is further obtained by the slipping clutch 5 that the transmission input shaft 19, which is decelerated during engagement of the new gear, does not relay the braking torque to the drive unit 2, which would result in an impairment of the comfort in driving.

REFERENCES 1 drive train
2 drive unit
3 transmission
4 input
5 clutch
6A to 6E toothed wheel pairs
7A to 7C free-wheel devices
9A to 9C change over sleeves
10A, 10B clutch pulleys
11A, 11B clutch pulleys
12A, 12B clutch pulleys
14, 15, 16 idler wheel
17 transmission output shaft
19 transmission input shaft
M_ab output torque
t time
T1 first range of the curve of the input torque
T2 point of the curve of the output torque
T3 first section of the curve of the output torque
T4 one other range of the curve of the output torque
T5 minimum of the curve of he output torque
T6 second section of the output torque
T7 point of the curve of the output torque
T8 third section of the curve of the output torque

What is claimed is:

1. A method for controlling and regulating a drive train (1) of a vehicle, comprising a drive unit (2), a transmission (3) and an output unit (4), wherein the transmission (3) has a plurality of controllable free-wheel units (7A to 7C) corresponding with a plurality of toothed wheel pairs (6A to 6E) for disconnecting or connecting an old or a new gear and one clutch (5) located on an input side, the method comprising the steps of:
    quickly reducing, in the presence of a shifting signal for carrying out a higher traction shift, an input torque of the drive unit (2) so that a first vibration in the drive train (1) is induced;
    abruptly producing, upon a subsequent gear shift, an operative connection between one of the plurality of controllable free-wheel units and one of the plurality of toothed wheel pairs of the new gear corresponding therewith in a manner such that in the drive train, a second vibration counteracting the first vibration is produced;
    canceling the operative connection of the old gear with the engagement of the new gear as a result of a torque reversal from a pull torque to a push torque.

2. The method according to claim 1, further comprising the step of providing an engagement point of the new gear in a manner such that the first and second vibrations at least approximately compensate each other.

3. The method according to claim 1, further comprising the step of adjusting in the present of a shifting signal, a transmission capacity of the clutch (5) so that an actual input torque of the drive unit (2) abutting thereon is transmitted to the output unit, the clutch (5) having at least an approximately slip-free state.

4. The method according to claim 2, further comprising the step of adjusting in the present of a shifting signal, a transmission capacity of the clutch (5) so that an actual input torque of the drive unit (2) abutting thereon is transmitted to the output unit, the clutch (5) having at least an approximately slip-free state.

5. The method according to claim 1, further comprising the step of controlling in the presence of a shifting signal an operative connection between one of the plurality of free-wheel units and one of the plurality of toothed wheel pairs corresponding therewith of an old gear so that an abutting pull torque is transmitted by one of the plurality of free-wheel units and one of the plurality of toothed wheel pairs and the operative connection of the old gear is canceled as soon as the push torque abuts.

6. The method according to claim 2, further comprising the step of controlling in the presence of a shifting signal an operative connection between one of the plurality of free-wheel units and one of the plurality of toothed wheel pairs corresponding therewith of an old gear so that an abutting pull torque is transmitted by one of the plurality of free-wheel units and one of the plurality of toothed wheel pairs and the operative connection of the old gear is canceled as soon as the push torque abuts.

7. The method according to claim 3, further comprising the step of controlling in the presence of a shifting signal an operative connection between one of the plurality of free-wheel units and one of the plurality of toothed wheel pairs corresponding therewith of an old gear so that an abutting pull torque is transmitted by one of the plurality of free-wheel units and one of the plurality of toothed wheel pairs and the operative connection of the old gear is canceled as soon as the push torque abuts.

8. The method according to claim 4, further comprising the step of controlling in the presence of a shifting signal an operative connection between one of the plurality of free-wheel units and one of the plurality of toothed wheel pairs corresponding therewith of an old gear so that an abutting pull torque is transmitted by one of the plurality of free-wheel units and one of the plurality of toothed wheel pairs and the operative connection of the old gear is canceled as soon as the push torque abuts.

9. The method according to claim 1, further comprising the step of designing the drive unit as a petrol motor and implementing the reduction of the input torque by an ignition engagement.

10. The method according to claim 2, further comprising the step of designing the drive unit as a petrol motor and implementing the reduction of the input torque by an ignition engagement.

11. The method according to claim 3, further comprising the step of designing the drive unit as a petrol motor and implementing the reduction of the input torque by an ignition engagement.

12. The method according to claim 8, further comprising the step of designing the drive unit as a petrol motor and implementing the reduction of the input torque by an ignition engagement.

13. The method according to claim 1, further comprising the step of designing the drive unit (2) as a diesel motor and implementing the reduction of the input torque via a scattering of an injection.

14. The method according to claim 2, further comprising the step of designing the drive unit (2) as a diesel motor and implementing the reduction of the input torque via a scattering of an injection.

15. The method according to claim 12, further comprising the step of designing the drive unit (2) as a diesel motor and implementing the reduction of the input torque via a scattering of an injection.

16. The method according to claim 1, further comprising the step of abruptly producing the operative connection of the new gear in a manner such that the output unit (4) is accelerated and a transmission input shaft (19) is decelerated.

17. The method according to claim 15, further comprising the step of abruptly producing the operative connection of the new gear in a manner such that the output unit (4) is accelerated and a transmission input shaft (19) is decelerated.

18. The method according to claim 1, further comprising the step of adjusting the transmission capacity of the clutch (5) during the shifting operation to a preset torque range so that when the new gear is engaged, the clutch (5) converts from an essentially slip free state to a slipping state.

19. The method according to claim 17, further comprising the step of adjusting the transmission capacity of the clutch (5) during the shifting operation to a preset torque range so that when the new gear is engaged, the clutch (5) converts from an essentially slip free state to a slipping state.

* * * * *